US011900690B2

(12) United States Patent
Hashimoto

(10) Patent No.: US 11,900,690 B2
(45) Date of Patent: Feb. 13, 2024

(54) APPARATUS, METHOD, AND COMPUTER PROGRAM FOR IDENTIFYING STATE OF SIGNAL LIGHT, AND CONTROLLER

(71) Applicant: TOYOTA JIDOSHA KABUSHIKI KAISHA, Toyota (JP)

(72) Inventor: Daisuke Hashimoto, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/215,181

(22) Filed: Mar. 29, 2021

(65) Prior Publication Data
US 2021/0312198 A1 Oct. 7, 2021

(30) Foreign Application Priority Data

Apr. 3, 2020 (JP) ................................ 2020-067925

(51) Int. Cl.
*G06V 20/58* (2022.01)
*B60Q 1/08* (2006.01)
*G06T 7/73* (2017.01)

(52) U.S. Cl.
CPC ........... *G06V 20/584* (2022.01); *B60Q 1/085* (2013.01); *G06T 7/73* (2017.01);
(Continued)

(58) Field of Classification Search
CPC ...... G06V 20/584; G06V 10/82; B60Q 1/085; B60Q 1/346; B60Q 1/44; G06T 7/73;
(Continued)

(56) References Cited

U.S. PATENT DOCUMENTS

2004/0143380 A1\* 7/2004 Stam .................... G06V 20/584
340/467
2015/0165962 A1\* 6/2015 Min ....................... B60Q 1/143
362/466
(Continued)

FOREIGN PATENT DOCUMENTS

CN 2019227954 \* 12/2019 ............... G06K 9/00
CN 113561896 \* 10/2021 ........... B60Q 11/005
(Continued)

OTHER PUBLICATIONS

Kuan-Hui Lee, et al., An Attention-based Recurrent Convolutional Network for Vehicle Taillight Recognition, 2019 IEEE Intelligent Vehicles Symposium (IV), pp. 2365-2370 (Jun. 9, 2019).

*Primary Examiner* — Jerome Grant, II
(74) *Attorney, Agent, or Firm* — Dickinson Wright, PLLC

(57) ABSTRACT

An apparatus for identifying the state of a signal light includes a processor configured to input time series images into a first classifier to detect object regions each including a vehicle equipped with a signal light in the respective images, the first classifier having been trained to detect the vehicle; chronologically input characteristics obtained from pixel values of the object regions detected in the respective images into a second classifier to calculate confidence scores of possible candidate states of the signal light of the vehicle, the second classifier having a recursive structure or performing a convolution operation in a temporal direction; and identify the state of the signal light, based on the preceding state of the signal light, information indicating whether transitions between the candidate states of the signal light are allowed, and the confidence scores of the respective candidate states.

8 Claims, 10 Drawing Sheets

(52) U.S. Cl.
CPC .............. *G06T 2207/20081* (2013.01); *G06T 2207/20084* (2013.01); *G06T 2207/30252* (2013.01)

(58) Field of Classification Search
CPC . G06T 2207/20081; G06T 2207/20084; G06T 2207/30252; G06T 2207/10024; G06T 2207/30261
USPC ........................................................ 382/103
See application file for complete search history.

(56) References Cited

U.S. PATENT DOCUMENTS

| | | |
|---|---|---|
| 2018/0053059 A1 | 2/2018 | Mei et al. |
| 2019/0066313 A1 | 2/2019 | Kim et al. |
| 2020/0097739 A1 | 3/2020 | Hashimoto et al. |
| 2021/0158699 A1 | 5/2021 | Yang |

FOREIGN PATENT DOCUMENTS

| | | | | |
|---|---|---|---|---|
| JP | 2006511383 A | 4/2006 | | |
| JP | 2010-129055 A | 6/2010 | | |
| JP | 2018026108 A | 2/2018 | | |
| JP | 2018028904 A | 2/2018 | | |
| JP | 6420422 | * 11/2018 | .............. | G06T 7/00 |
| JP | 2019109602 A | 7/2019 | | |
| JP | 2020052695 A | 4/2020 | | |
| JP | 7226368 | * 2/2023 | .............. | G06T 7/00 |
| WO | 2019/227954 A1 | 12/2019 | | |

* cited by examiner

APPARATUS, METHOD, AND COMPUTER PROGRAM FOR IDENTIFYING STATE OF SIGNAL LIGHT, AND CONTROLLER

FIELD

The present invention relates an apparatus, a method, and a computer program for identifying states related to ON and OFF of a signal light of a vehicle represented in an image, and a controller including such an apparatus to control travel of a vehicle.

BACKGROUND

Techniques to detect an object indicated by sensor information, such as an image obtained by a camera, have been researched. In recent years, a technique has been proposed that use a method of machine learning, such as a "deep neural network" (hereafter, a "DNN") for detecting an object to improve the accuracy of detection.

To track an object represented in an image, techniques have been proposed that use time series images or features obtained therefrom as inputs into a neural network (e.g., see Japanese Unexamined Patent Publication No. 2018-26108).

For example, Japanese Unexamined Patent Publication No. 2018-26108 discloses an object tracking method in which two or more time series images are inputted into a neural network. In this method, those features of the images which are extracted by the neural network are compared to check whether they have similarity; and based on the result of comparison, identification information and position information about one or more objects, which are depicted in a chronologically later image and match one or more tracking candidate objects depicted in a chronologically earlier image, are outputted as an identification result. The neural network used therein includes two or more identical structures each having zero or more fully-connected layers and one or more convolution layers, and shares parameters among corresponding layers across the identical structures.

SUMMARY

The motion of a vehicle near a host vehicle is predicted to perform automated driving control of the host vehicle or to assist a driver in driving the host vehicle. For such prediction of the motion of a vehicle, information as to whether a signal light of this vehicle, such as a turn signal or a brake light, is on or off is useful. However, the above-described technique may fail to correctly identify states related to ON and OFF of a signal light of a vehicle represented in an image.

It is an object of the present invention to provide an apparatus that can identify states related to ON and OFF of a signal light of a vehicle represented in an image.

According to an embodiment, an apparatus for identifying the state of a signal light is provided. The apparatus includes a processor configured to: input time series images into a first classifier to detect object regions each including a vehicle equipped with a signal light in the respective images, the first classifier having been trained to detect the vehicle; chronologically input characteristics obtained from pixel values of the object regions detected in the respective images into a second classifier to calculate confidence scores of possible candidate states of the signal light of the vehicle, the second classifier having a recursive structure or performing a convolution operation in a temporal direction; and identify the state of the signal light, based on the preceding state of the signal light, information indicating whether transitions between the candidate states of the signal light are allowed, and the confidence scores of the respective candidate states.

The information preferably indicates candidate states to which the respective candidate states are allowed to change, and of the candidate states to which the preceding state of the signal light is allowed to change, the processor of the apparatus identifies the state of the signal light as a candidate state having a maximum confidence score.

In this case, the candidate states of the signal light preferably include a turn-on state in which the signal light is turned on, a turn-off state in which the signal light is turned off, an ON state during which the signal light is on, and an OFF state during which the signal light is off.

In this case, the second classifier preferably calculates confidence scores of the turn-on state, the turn-off state, and a steady state that implies the ON state or the OFF state.

The information preferably indicates that the turn-on state is allowed to change to the turn-on state itself, the ON state, or the turn-off state, and when the preceding state of the signal light is the turn-on state and the steady state has a higher confidence score than the turn-on state and the turn-off state, the processor identifies the state of the signal light as the ON state.

The information preferably indicates that the turn-off state is allowed to change to the turn-off state itself, the OFF state, or the turn-on state, and when the preceding state of the signal light is the turn-off state and the steady state has a higher confidence score than the turn-on state and the turn-off state, the processor identifies the state of the signal light as the OFF state.

Alternatively, the information preferably indicates, for each of the candidate states, probabilities of transition from the candidate state to other candidate states, and the processor calculates, for each of the candidate states of the signal light, a corrected confidence score by multiplying the confidence score of the candidate state by the probability of transition from the preceding state of the signal light to the candidate state, and identifies the state of the signal light as one of the candidate states of the signal light having a maximum corrected confidence score.

According to another embodiment of the present invention, a controller for controlling travel of a vehicle is provided. The controller includes a processor configured to: input time series images into a first classifier to detect object regions each including another vehicle equipped with a signal light in the respective images, the first classifier having been trained to detect the other vehicle; chronologically input characteristics obtained from pixel values of the object regions detected in the respective images into a second classifier to calculate confidence scores of possible candidate states of the signal light of the other vehicle, the second classifier having a recursive structure or performing a convolution operation in a temporal direction; and identify the state of the signal light of the second vehicle, based on the preceding state of the signal light of the second vehicle, information indicating whether transitions between the candidate states of the signal light are allowed, and the confidence scores of the respective candidate states of the signal light. The processor is further configured to predict a trajectory on which the other vehicle will travel, based on the state of the signal light of the other vehicle, determine a trajectory to be traveled of the vehicle, based on the predicted trajectory, so that the vehicle will be separated from the other vehicle more than a predetermined distance; and control the vehicle so that the vehicle will travel along the trajectory to be traveled.

According to still another embodiment of the present invention, a method for identifying the state of a signal light is provided. The method includes: inputting time series images into a first classifier to detect object regions each including a vehicle equipped with a signal light in the respective images, the first classifier having been trained to detect the vehicle; chronologically inputting characteristics obtained from pixel values of the object regions detected in the respective images into a second classifier to calculate confidence scores of possible candidate states of the signal light of the vehicle, the second classifier having a recursive structure or performing a convolution operation in a temporal direction; and identifying the state of the signal light, based on the preceding state of the signal light, information indicating whether transitions between the candidate states are allowed, and the confidence scores of the respective candidate states.

According to yet another embodiment of the present invention, a non-transitory recording medium having recorded thereon a computer program for identifying the state of a signal light is provided. The computer program includes instructions for causing a computer to execute a process including: inputting time series images into a first classifier to detect object regions each including a vehicle equipped with a signal light in the respective images, the first classifier having been trained to detect the vehicle; chronologically inputting characteristics obtained from pixel values of the object regions detected in the respective images into a second classifier to calculate confidence scores of possible candidate states of the signal light of the vehicle, the second classifier having a recursive structure or performing a convolution operation in a temporal direction; and identifying the state of the signal light, based on the preceding state of the signal light, information indicating whether transitions between the candidate states are allowed, and the confidence scores of the respective candidate states.

The apparatus according to the present invention has an advantageous effect of being able to identify states related to ON and OFF of a signal light of a vehicle represented in an image.

DESCRIPTION OF EMBODIMENTS

Figure 1:
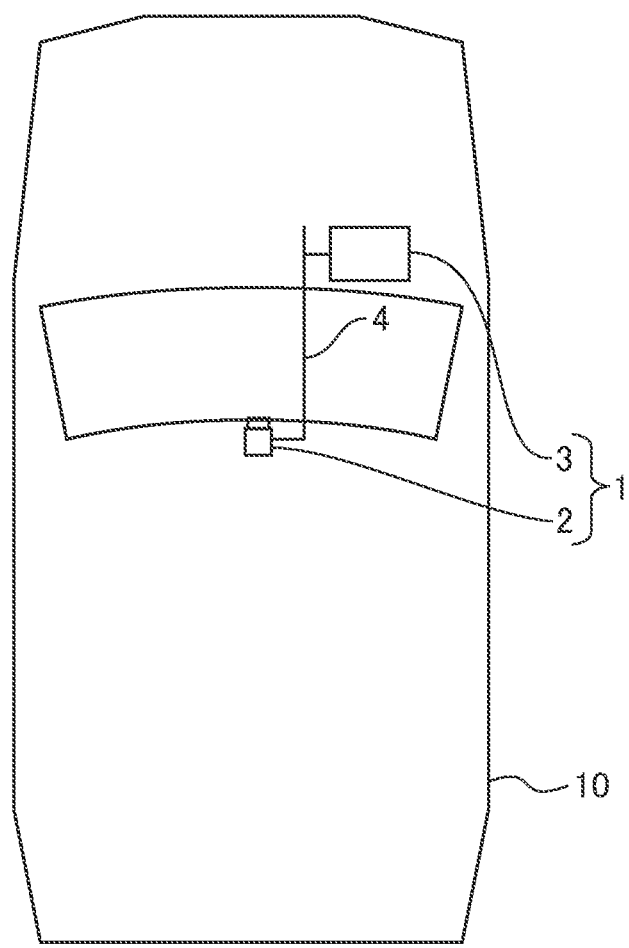
FIG. 1 schematically illustrates the configuration of a vehicle control system including an apparatus for identifying the state of a signal light.

Hereinafter, an apparatus for identifying the state of a signal light, a method therefor performed by the apparatus, and a computer program therefor will be described with reference to the accompanying drawings. The apparatus identifies states related to ON and OFF of a signal light (hereafter simply "states of a signal light") of a vehicle, such as a brake light or a turn signal, represented in time series images. To this end, the apparatus inputs the images into a first classifier that has been trained to detect a vehicle, thereby detecting regions each including a vehicle (hereafter, "object regions") in the respective images. The apparatus then tracks the vehicle detected from the images to associate the object regions representing the same vehicle in the images with each other. The apparatus also chronologically inputs characteristics obtained from pixel values of the object regions representing the same vehicle in the respective images into a second classifier, which has a recursive structure or can perform a convolution operation in the temporal direction, thereby calculating confidence scores of possible states (hereafter, "candidate states") related to ON or OFF of a signal light of this vehicle. The apparatus then identifies the state of the signal light of the vehicle as a candidate state having a maximum confidence score, of two or more candidate states to which the preceding state of the signal light is allowed to change.

For example, when a vehicle slows down or stops, its brake lights, which are an example of a signal light of a vehicle, are turned on; and when a vehicle starts traveling or travels at a constant speed, its brake lights are turned off. In this way, ON and OFF of a signal light changes over time. However, since an individual image representing a signal light does not indicate time-varying changes caused by its blinking, it is difficult to accurately identify whether a signal light is on or off, based on an individual image representing such a light. The apparatus can accurately calculate confidence scores of possible candidate states of a signal light, by inputting characteristics obtained from pixel values of object regions in time series images into the above-mentioned second classifier. Additionally, the apparatus can accurately identify the state of a signal light of a vehicle, based on whether transitions from the preceding state of the signal light to individual candidate states are allowed, and the confidence scores of the respective candidate states, even if the cycle of ON and OFF of the signal light and the length of the period during which the signal light is on are indefinite.

The following describes an example in which the apparatus for identifying the state of a signal light is applied to a vehicle control system. In this example, the apparatus performs a signal-light identifying process on time series images obtained by a camera mounted on a host vehicle, thereby detecting another vehicle near the host vehicle. The apparatus then identifies the state of the brake lights of the detected vehicle. The apparatus also identifies the state of a turn signal, which is another example of a signal light of a vehicle. Note that the apparatus may be applied to any other system.

Figure 2:
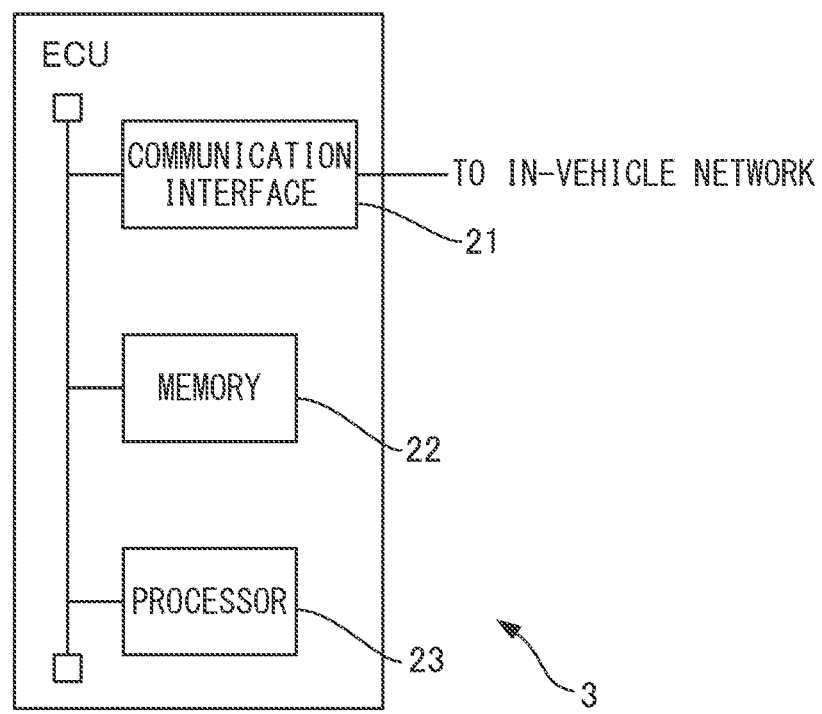
FIG. 2 illustrates the hardware configuration of an electronic control unit, which is an embodiment of the apparatus.

FIG. 1 schematically illustrates the configuration of a vehicle control system including an apparatus for identifying the state of a signal light. FIG. 2 illustrates the hardware configuration of an electronic control unit, which is an embodiment of the apparatus. In the present embodiment, the vehicle control system 1, which is mounted on a vehicle 10 and controls the vehicle 10, includes a camera 2 for capturing surroundings of the vehicle 10, and an electronic control unit (ECU) 3, which is an example of the apparatus. The camera 2 is connected to the ECU 3 so that they can communicate via an in-vehicle network 4 conforming to a standard, such as a controller area network. The vehicle control system 1 may further include a storage device storing a map used for automated driving control of the vehicle 10. The vehicle control system 1 may further include a range sensor, such as LiDAR or radar; a receiver for determining the location of the vehicle 10 in conformity with a satellite positioning system, such as a GPS receiver; a wireless communication terminal for wireless communication with another device; and a navigation device for searching for a planned travel route of the vehicle 10.

The camera 2 is an example of an image capturing unit that is a sensor for detecting an object in a predetermined sensing range. The camera 2 includes a two-dimensional detector constructed from an array of optoelectronic transducers, such as CCD or C-MOS, having sensitivity to visible light and a focusing optical system focusing an image of a target region on the two-dimensional detector. The camera 2 is mounted, for example, in the interior of the vehicle 10 so as to be oriented to the front direction of the vehicle 10. The camera 2 captures a region in front of the vehicle 10 every predetermined capturing period (e.g., 1/30 to 1/10 seconds), and generates images in which this region is represented. The images obtained by the camera 2 are preferably color images. The vehicle 10 may include multiple cameras taking pictures in different orientations or having different focal lengths.

Every time generating an image, the camera 2 outputs the generated image to the ECU 3 via the in-vehicle network 4.

The ECU 3 controls the vehicle 10. In the present embodiment, the ECU 3 controls the vehicle 10 so as to automatically drive the vehicle 10, depending on an object detected from time series images obtained by the camera 2. To this end, the ECU 3 includes a communication interface 21, a memory 22, and a processor 23.

The communication interface 21, which is an example of a communication unit, includes an interface circuit for connecting the ECU 3 to the in-vehicle network 4. In other words, the communication interface 21 is connected to the camera 2 via the in-vehicle network 4. Every time receiving an image from the camera 2, the communication interface 21 passes the received image to the processor 23.

The memory 22, which is an example of a storing unit, includes, for example, volatile and nonvolatile semiconductor memories. In the case that the processor 23 includes multiple operating units as will be described below, the memory 22 may include dedicated memory circuits for the respective operating units. The memory 22 stores various types of data and various parameters used in the signal-light identifying process performed by the processor 23 of the ECU 3, e.g., images received from the camera 2, various parameters for specifying classifiers used in the signal-light identifying process, confidence-score thresholds for respective types of objects, allowed transition information indicating whether transitions between possible candidate states of a signal light are allowed, and thresholds to be compared with confidence scores related to states of a signal light. The memory 22 also stores various types of data generated in the signal-light identifying process, such as a detected-object list indicating information related to detected objects, for a certain period. The memory 22 may further store information used for travel control of the vehicle 10, such as map information.

The processor 23, which is an example of a control unit, includes one or more central processing units (CPUs) and a peripheral circuit thereof. The processor 23 may further include another operating circuit, such as a logic-arithmetic unit, an arithmetic unit, or a graphics processing unit (GPU). Every time receiving an image from the camera 2 during travel of the vehicle 10, the processor 23 performs a vehicle control process including the signal-light identifying process on the received image. The processor 23 controls the vehicle 10 so as to automatically drive the vehicle 10, depending on a detected object near the vehicle 10.

Figure 3:
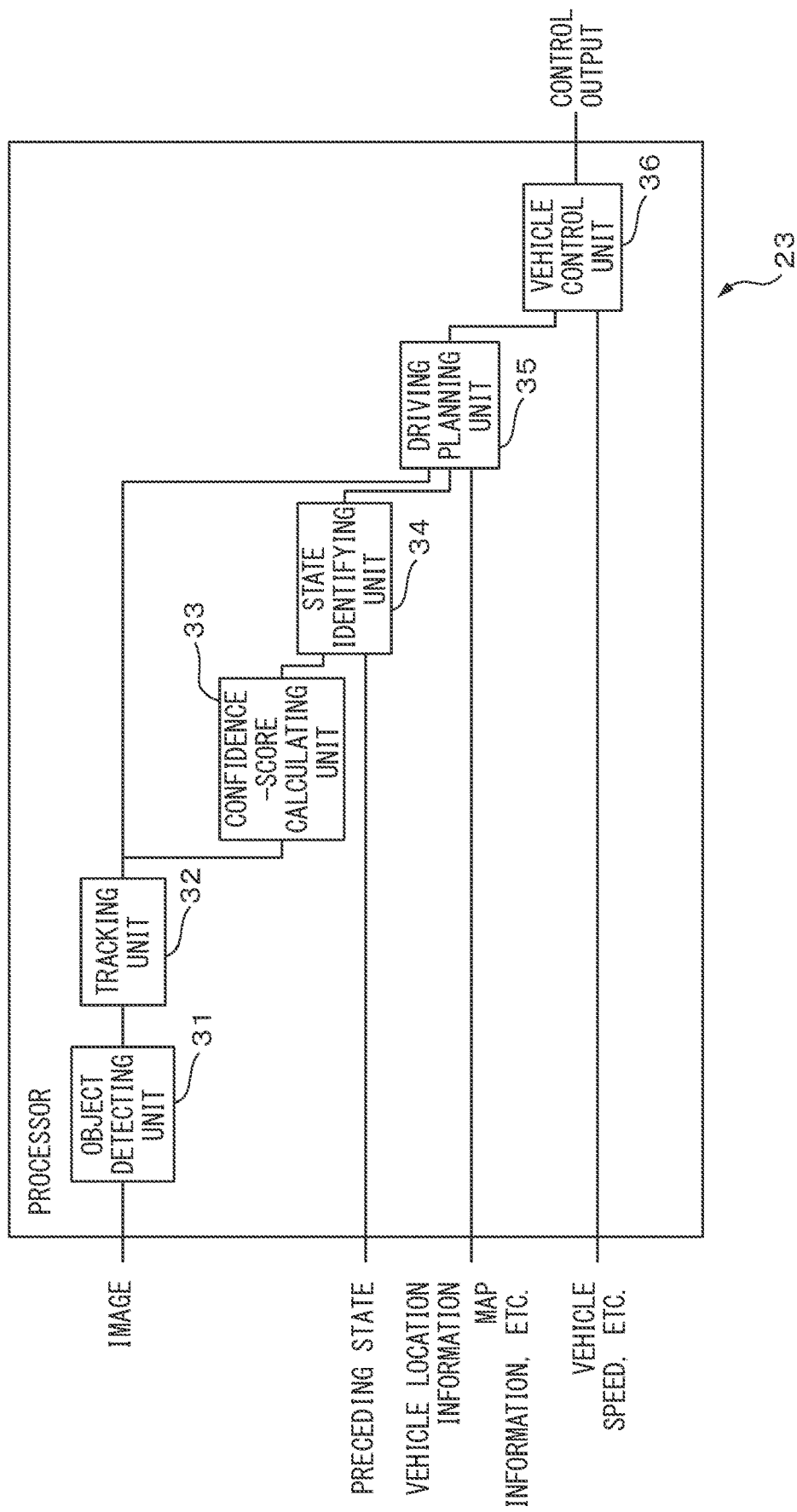
FIG. 3 is a functional block diagram of a processor of the electronic control unit, related to a vehicle control process including a signal-light identifying process.

FIG. 3 is a functional block diagram of the processor 23 of the ECU 3, related to the vehicle control process including the signal-light identifying process. The processor 23 includes an object detecting unit 31, a tracking unit 32, a confidence-score calculating unit 33, a state identifying unit 34, a driving planning unit 35, and a vehicle control unit 36. These units included in the processor 23 are, for example, functional modules implemented by a computer program executed on the processor 23, or may be dedicated operating circuits provided in the processor 23. Of these units included in the processor 23, the object detecting unit 31, the tracking unit 32, the confidence-score calculating unit 33, and the state identifying unit 34 perform the signal-light identifying process. In the case that the vehicle 10 includes multiple cameras, the processor 23 may perform the signal-light identifying process for each camera, based on images obtained by the camera.

Every time receiving an image from the camera 2, the object detecting unit 31 inputs the latest received image into a first classifier for object detection to detect an object region including a detection target (including a vehicle) in the image and to identify the type of the detection target.

In the present embodiment, the object detecting unit 31 uses, as the first classifier, a DNN that has been trained to detect an object region including a detection target represented in an image and to identify the type of the detection target. The DNN used by the object detecting unit 31 may be, for example, a DNN having a convolutional neural network (hereafter, "CNN") architecture, such as a Single Shot MultiBox Detector (SSD) or a Faster R-CNN.

Figure 4:
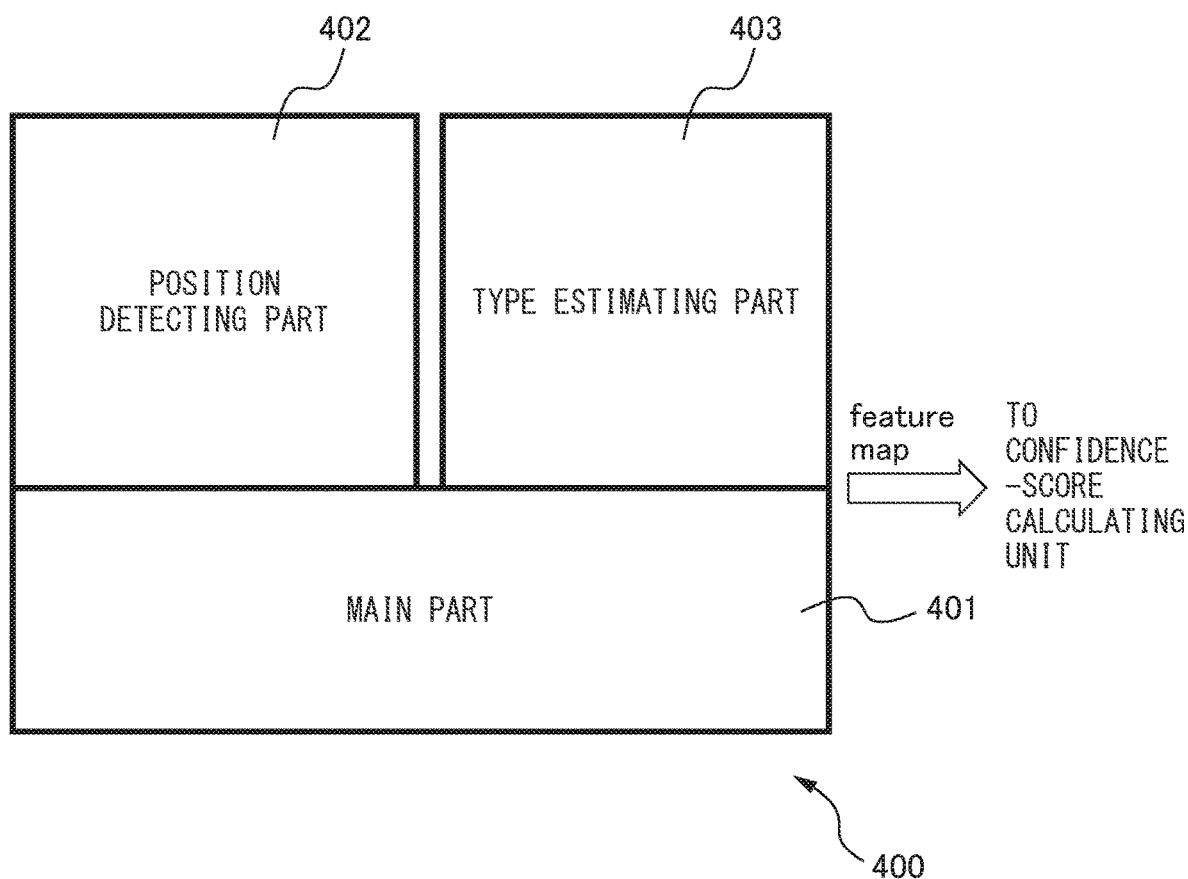
FIG. 4 illustrates an example of the configuration of a DNN used as the first classifier.

FIG. 4 illustrates an example of the configuration of a DNN used as the first classifier. The DNN 400 includes a main part 401, which is provided on the input of images, and a position detecting part 402 and a type estimating part 403, which are provided closer to the output than the main part 401. The position detecting part 402 outputs, as an object region, the circumscribed rectangle of a detection target represented in an image, depending on the output from the main part 401. The type estimating part 403 calculates confidence scores of respective types of detection targets represented in object regions detected by the position detecting part 402, depending on the output from the main part 401. The position detecting part 402 and the type estimating part 403 may be integrated.

The main part 401 may be, for example, a CNN including multiple layers connected in series from the input toward the output. These multiple layers include two or more convolution layers. The multiple layers of the main part 401 may further include a pooling layer every one or more convolution layers. The multiple layers of the main part 401 may further include one or more fully-connected layers. For example, the main part 401 may be configured similarly to a base layer of an SSD. Alternatively, the main part 401 may be configured in accordance with another CNN architecture, such as VGG-19, AlexNet, or Network-In-Network.

Upon input of an image, the main part 401 performs an operation on the image in each layer to output a feature map calculated from the image. The main part 401 may output multiple feature maps of different resolutions. For example, the main part 401 may output a feature map with the same resolution as the inputted image, and one or more feature maps with a resolution lower than the inputted image.

The feature maps outputted from the main part 401 are inputted into the position detecting part 402 and the type estimating part 403. The position detecting part 402 and the type estimating part 403 may be, for example, CNNs each including multiple layers connected in series from the input toward the output. In the position detecting part 402 and the type estimating part 403, the multiple layers of each CNN include two or more convolution layers. In the position detecting part 402 and the type estimating part 403, the multiple layers of each CNN may include a pooling layer every one or more convolution layers. The convolution layers and the pooling layers may be common to the CNNs of the position detecting part 402 and the type estimating part 403. Additionally, in the position detecting part 402 and the type estimating part 403, the multiple layers may include one or more fully-connected layers. In this case, the fully-connected layers are preferably provided closer to the output than the convolution layers. The outputs from the convolution layers may be directly inputted into the fully-connected layers. The output layer of the type estimating part 403 may be a softmax layer that calculates confidence scores of respective types of detection targets in accordance with a softmax function, or a sigmoid layer that calculates such confidence scores in accordance with a sigmoid function.

The position detecting part 402 and the type estimating part 403 are trained so as to output confidence scores of respective types of detection targets, for example, for each of regions located at various positions in an image and having various sizes and aspect ratios. Thus, upon input of an image, the classifier 400 outputs confidence scores of respective types of detection targets for each of regions located at various positions in the image and having various sizes and aspect ratios. The position detecting part 402 and the type estimating part 403 then detect a region for which the confidence score of a certain type of detection target is not less than a predetermined confidence-score threshold, as an object region representing a detection target of this type.

Images (training images) included in training data used for training of the classifier 400 are tagged with, for example, types of detection targets (e.g., ordinary passenger cars, buses, trucks, and motorcycles) and circumscribed rectangles of the detection targets, which are object regions representing the detection targets.

The classifier 400 is trained with a large number of training images like those described above in accordance with a training technique, such as backpropagation. The use of the classifier 400 trained in this way allows the processor 23 to accurately detect, from an image, a target object for detection.

Detection targets may include an object that affects travel control of the vehicle 10, besides vehicles near the vehicle 10. Examples of such an object include a human, a signpost, a traffic light, a road marking such as a lane division line, and another object on a road. In this case, the first classifier is trained in advance to detect these objects. The object detecting unit 31 can also detect these objects by inputting an image into the first classifier.

The object detecting unit 31 may further perform a non-maximum suppression (NMS) process to select one of object regions that are assumed to represent the same object out of two or more overlapping object regions.

The object detecting unit 31 enters, in a detected-object list, the position and area of each object region in the image, and the type of the object included in the object region. The object detecting unit 31 stores the detected-object list in the memory 22. For each object region, the object detecting unit 31 also stores, in the memory 22, a feature map that is calculated by the main part of the first classifier from the pixels included in the object region and is outputted to the confidence-score calculating unit 33. Feature maps outputted to the confidence-score calculating unit 33 may be ones with the same resolution as an image inputted into the first classifier. In the case that, for example, the pooling layer included in the main part of the first classifier calculates a feature map with a resolution lower than an inputted image, this low-resolution feature map may be outputted to the confidence-score calculating unit 33. Feature maps of different resolutions calculated by the main part of the first classifier may be outputted to the confidence-score calculating unit 33.

The tracking unit 32 refers to the detected-object list to associate, for each object region detected from the latest image, the detection target represented in the object region with a detection target detected from a past image, thereby tracking the detection target represented in the object region. When the number of tracked vehicles, out of the tracked detection targets, is greater than a predetermined number (e.g., 5 to 10), the tracking unit 32 selects, out of the tracked vehicles, a predetermined number of vehicles as target vehicles for identification of the state of a signal light (hereafter simply "signal-light identification").

The tracking unit 32 applies, for example, a tracking process based on optical flow, such as the Lucas-Kanade method, to an object region of interest in the latest image and the object regions in the past images, thereby tracking the detection target represented in the object region. To this end, the tracking unit 32 applies, for example, a filter for extracting characteristic points, such as a SIFT or Harris operator, to the object region of interest, thereby extracting multiple characteristic points from this object region. Then, the tracking unit 32 may identify those points in the object regions in the past images which correspond to each of the characteristic points in accordance with the applied tracking technique, thereby calculating the optical flow. Alternatively, the tracking unit 32 may apply another tracking technique, which is applied for tracking a moving object detected from an image, to the object region of interest in the latest image and the object regions in the past images, thereby tracking the detection target represented in the object region.

The tracking unit 32 regards a detection target that is detected from the latest image and associated with none of detection targets represented in the past images as a new tracking target, assigns this detection target an identification number different from the identification numbers of the other tracked detection targets, and enters the assigned identification number in the detected-object list. The tracking unit 32 associates a detection target that is detected from the latest image and associated with a detection target represented in the past images, i.e., one of the tracked detection targets, with the same identification number as assigned to this tracked detection target.

As described above, when the number of tracked vehicles is greater than a predetermined number, the tracking unit 32 selects, out of the tracked vehicles, a predetermined number of vehicles as target vehicles for signal-light identification.

For example, since a tracked vehicle closer to the vehicle 10 affects driving control of the vehicle 10 more, the tracking unit 32 selects a predetermined number of tracked vehicles in ascending order of distance from the vehicle 10. For example, it is supposed that the larger the object region representing a tracked vehicle in an image, the shorter the distance from the vehicle to this tracked vehicle. Thus, the tracking unit 32 selects, for example, a predetermined number of tracked vehicles in descending order of size of object regions in the latest image.

Alternatively, the tracking unit 32 may select a predetermined number of tracked vehicles, based on the positions of bottoms of the object regions of the tracked vehicles in an image. When a tracked vehicle is traveling on the same road as the vehicle 10, the position of the bottom of the object region representing this tracked vehicle in an image is assumed to be the location of this detection target on the road surface. As a tracked vehicle is closer to the vehicle the direction from the camera 2 to the location of this tracked vehicle on the road surface is closer to the downward direction, and thus the bottom of the object region in an image is closer to the bottom of the image. Hence, it is supposed that the closer to an edge of an image the bottom of an object region, the shorter the distance from the vehicle 10 to the tracked vehicle represented in the object region. Thus, the tracking unit 32 may select a predetermined number of tracked vehicles in the latest image in ascending order of distances between the bottoms of object regions and the bottom of the image.

Alternatively, the tracking unit 32 may estimate, for each tracked vehicle, the distance from the vehicle 10 to the tracked vehicle, based on the ratio of the size (e.g., width) of the object region representing the tracked vehicle to a reference size, which is the size of a reference object of the same type as the tracked vehicle measured under the assumption that the reference object is a predetermined distance apart from the vehicle 10. Alternatively, in the case that the vehicle control system 1 includes a range sensor (not illustrated), such as LiDAR or radar, the range sensor may measure the distance to each tracked vehicle. In this case, for example, the distance in that direction from the range sensor which corresponds to the direction from the camera 2 to the location corresponding to the centroid of an object region representing a tracked vehicle in an image is measured as the distance from the vehicle 10 to this tracked vehicle. Then, the tracking unit 32 may select a predetermined number of tracked vehicles in ascending order of estimated or measured distance from the vehicle 10.

Alternatively, the tracking unit 32 may select a predetermined number of tracked vehicles lane by lane. For example, the tracking unit 32 selects a tracked vehicle assumed to be the closest to the vehicle 10 out of the tracked vehicles traveling on the same lane as the vehicle 10. The tracking unit 32 also selects a tracked vehicle assumed to be the closest to the vehicle 10 for each of the two lanes adjoining the travel lane of the vehicle 10 and the two additional lanes respectively adjoining these adjoining lanes (i.e., the two right and two left lanes with respect to the travel lane of the vehicle 10). In this case, for example, when the object detecting unit 31 or a localizing processing unit (not illustrated) detects lane division lines from the latest image, the tracking unit 32 may identify the lanes on which the respective tracked vehicles are traveling, based on the positional relationship between the lane division lines and the object regions. For example, the tracking unit 32 may determine that a tracked vehicle of interest is on the lane sandwiched between two lane division lines located on the respective sides of the bottom of the object region including this tracked vehicle. The tracking unit 32 may select, for each lane, the tracked vehicle closest to the vehicle 10 out of the tracked vehicles traveling on the lane in a manner similar to the selection of tracked vehicles described above. The tracking unit 32 may select two or more tracked vehicles in ascending order of distance from the vehicle 10 for each lane.

Figure 5:
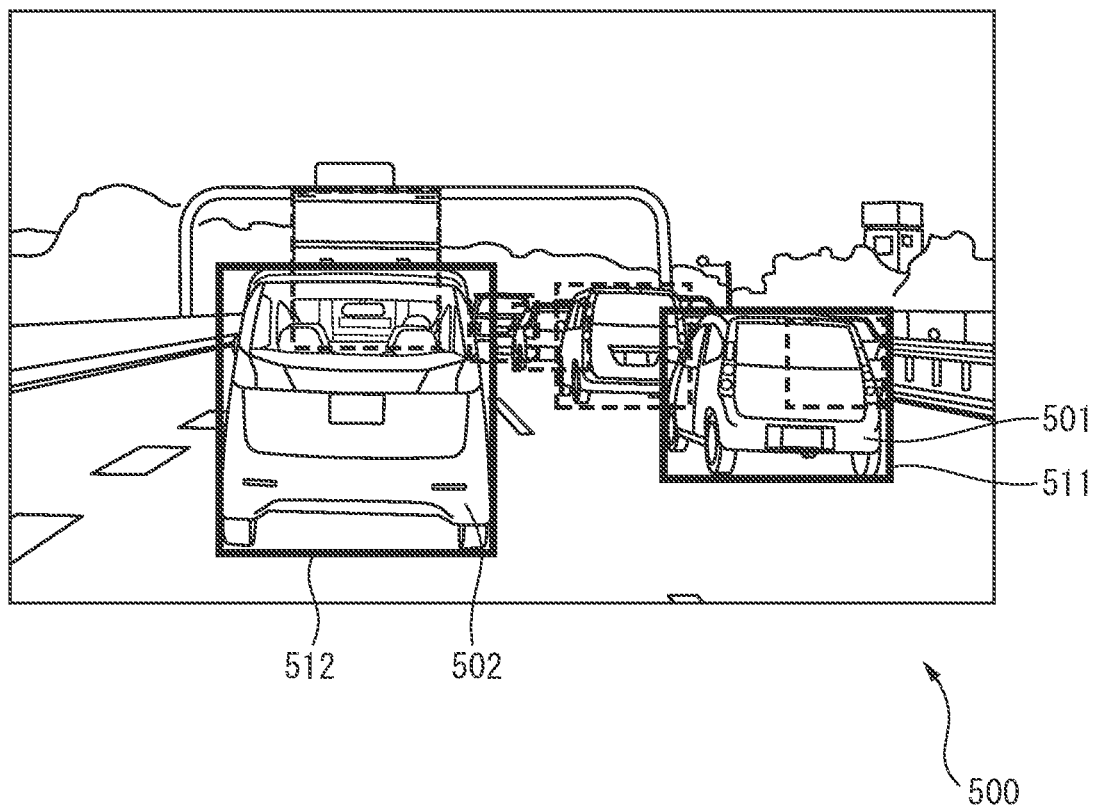
FIG. 5 illustrates an example of selection of target vehicles for identification of the state of a signal light.

FIG. 5 illustrates an example of selection of target vehicles for identification of the state of a signal light. An image 500 represents several vehicles, which are detected as detection targets. Of the vehicles traveling on the right lane adjoining the travel lane of the vehicle 10, a vehicle 501 has the largest object region and is assumed to be the closest to the vehicle 10. Thus, the vehicle 501 is selected as a target object for signal-light identification. Characteristics obtained from pixel values of the object region 511 including the vehicle 501 are used for identifying the state of a signal light of the vehicle 501.

Similarly, of the vehicles traveling on the same lane as the vehicle 10, a vehicle 502 has the largest object region and is assumed to be the closest to the vehicle 10. Thus, the vehicle 502 is selected as a target object for signal-light identification. Characteristics obtained from pixel values of the object region 512 including the vehicle 502 are used for identifying the state of a signal light of the vehicle 502.

According to a modified example, the tracking unit 32 may select all of the tracked vehicles as target objects for signal-light identification.

The tracking unit 32 notifies the confidence-score calculating unit 33 of the identification numbers of the tracked target vehicles for signal-light identification. In addition, the tracking unit 32 updates the values of indices in the detected-object list indicating the target objects for signal-light identification, based on the results of determination regarding the targets for signal-light identification.

For each tracked target vehicle for signal-light identification, the confidence-score calculating unit 33 inputs characteristics obtained from pixel values of the object region including the tracked vehicle into a second classifier, which performs a convolution operation in the temporal direction, thereby calculating confidence scores of possible states of a signal light of the tracked vehicle.

In the present embodiment, the confidence-score calculating unit 33 calculates, for each of the right and left turn signals, confidence scores indicating how likely the turn signal is in a blinking state. The confidence-score calculating unit 33 also calculates confidence scores respectively indicating how likely brake lights are in a turn-on state, an ON state, a turn-off state, and an OFF state. The turn-on state is such that brake lights having been off are turned on, i.e., switch from OFF to ON in a preceding predetermined period. The turn-off state is such that brake lights having been on are turned off, i.e., switch from ON to OFF in a preceding predetermined period. The ON state is such that brake lights are kept on over a preceding predetermined period. The OFF state is such that brake lights are kept off over a preceding predetermined period. The predetermined period is, for example, the period during which the second classifier performs a convolution operation in the temporal direction.

As the characteristics obtained from pixel values of an object region representing a tracked target vehicle for signal-light identification, the confidence-score calculating unit 33 may use, for example, features included in this object region, of a feature map calculated by the main part of the first classifier. This allows for using not only the characteristics of the tracked target vehicle for signal-light identification but also those of surroundings of the tracked vehicle for signal-light identification. In the present embodiment, the second classifier can calculate confidence scores of possible states of a signal light, taking account of the effect of the positional relationship between the tracked target vehicle for signal-light identification and another vehicle, e.g., the situation in which a turn signal of the tracked target vehicle is partially covered by another vehicle. For example, when the resolution of the feature map is the same as that of an image inputted into the first classifier, the features included in the region in the feature map corresponding to an object region in the inputted image are the characteristics obtained from pixel values of the object region. When the resolution of the feature map is lower than that of an image inputted into the first classifier, the position and area obtained by correcting the coordinates of an object region as a function of the ratio of the resolution of the feature map to that of the inputted image define the region in the feature map corresponding to the object region. The features included in this region in the feature map are the characteristics obtained from pixel values of the object region. For example, assume that the upper left end and the lower right end of the object region in the inputted image are (tlX, tlY) and (brX, brY), respectively, and that the feature map is calculated by scale-down of the inputted image to 1/N (N is an integer not less than two). In this case, the upper left end and the lower right end of the region in the feature map corresponding to the object region in the inputted image are (tlX/N, tlY/N) and (brX/N, brY/N), respectively.

According to a modified example, the confidence-score calculating unit 33 may input, into the second classifier, pixel values of an object region representing a tracked target vehicle for signal-light identification in an image inputted into the first classifier as the characteristics obtained from pixel values of the object region representing the tracked target vehicle. Alternatively, the confidence-score calculating unit 33 may input, into the second classifier, values obtained by performing a predetermined filtering process, such as a convolution operation, on the pixels of the object region as the characteristics obtained from pixel values of the object region representing the tracked target vehicle.

The confidence-score calculating unit 33 performs downsampling or upsampling on the extracted characteristics of each object region to resize them to a predetermined size (e.g., 32 by 32). This allows constant-size characteristics to be inputted into the second classifier even if the size of the tracked vehicle changes in the image due to a change in the relative distance between the vehicle 10 and the tracked vehicle during tracking. Thus, the configuration of the second classifier is simplified.

Figure 6:
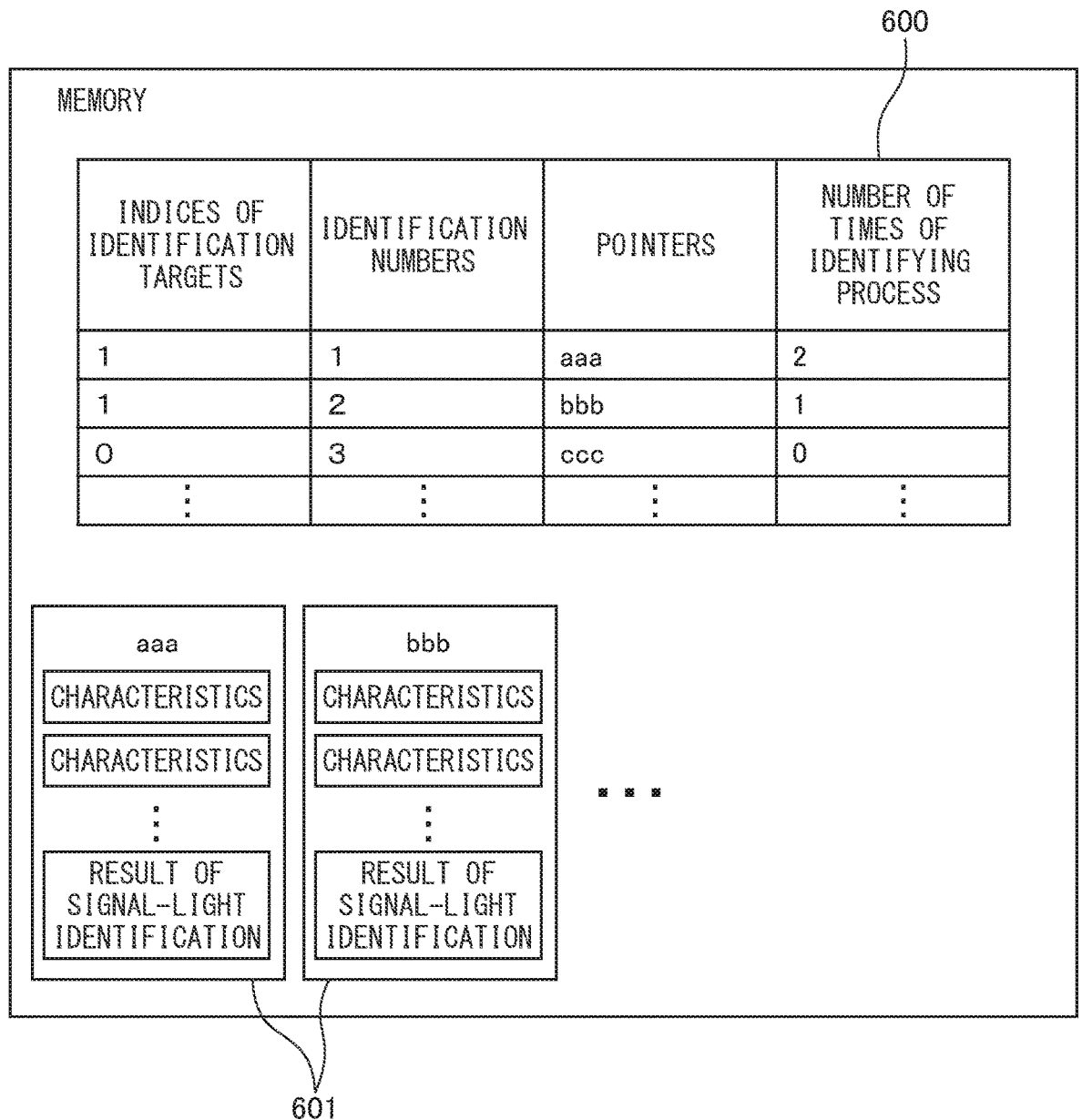
FIG. 6 illustrates an example of a detected-object list.

FIG. 6 illustrates an example of the detected-object list. For each tracked detection target, the detected-object list 600 contains an index indicating whether the detection target is a target for signal-light identification, an identification number assigned to the detection target, a pointer indicating the address of the memory 22 where information related to the detection target is stored, and the number of times of signal-light identification performed by the state identifying unit 34 (i.e., the number of times characteristics in a corresponding object region are inputted into the second classifier). For each tracked detection target, the detected-object list 600 also contains information (not illustrated) indicating the position and area of the object region, information (not illustrated) indicating the type of the detection target, and other information. A storage area 601 in the memory 22 indicated by the pointer for each detection target stores the characteristics, which is obtained from the object regions in time series images captured in a preceding predetermined period and inputted into the second classifier, and the result of identification of the latest state of a signal light.

For each tracked target vehicle for signal-light identification, the confidence-score calculating unit 33 chronologically inputs characteristics obtained from pixel values of the object regions each including the tracked vehicle in time series images captured in a preceding predetermined period into the second classifier, which chronologically performs a convolution operation in the temporal direction, thereby calculating confidence scores of respective possible states of a signal light of the tracked vehicle.

It is preferable that the predetermined period be substantially as long as the period of blinking of a turn signal, for the following reasons. In general, a turn signal is repeatedly turned on and off in a predetermined cycle during operation. Thus, the second classifier can accurately calculate the confidence score of the state of a turn signal in response to input of characteristics obtained from images captured in a period longer than the period of blinking. However, the longer the predetermined period, the more the number of characteristics inputted into the second classifier. This will increase the amount of computation of the second classifier, and require more hardware resources for the operation of the second classifier. Thus, the predetermined period is preferably short in terms of the required hardware resources. For these reasons, it is preferable that the predetermined period be substantially as long as the period of blinking of a turn signal, as described above. However, in the case that there are enough hardware resources for the ECU 3, the predetermined period may be longer than the period of blinking of a turn signal. In this case, the length of the predetermined period may be determined, for example, at designing and training the second classifier so as to optimize the amount of required hardware resources and the accuracy of signal-light identification that are conflicting with each other.

As the second classifier that performs a convolution operation in the temporal direction, the confidence-score calculating unit 33 may use a neural network having a CNN architecture. In this case, the second classifier includes, for example, one or more convolution layers that perform a convolution operation on a feature map outputted from the immediately preceding layer along the temporal direction (hereafter, "temporal-feature convolution layers"). The size of a kernel of the temporal-feature convolution layers related to the temporal direction is determined, for example, so that the convolution operation may be performed all over the predetermined period including characteristics inputted all at once by going through all of the temporal-feature convolution layers. The temporal-feature convolution layers may perform a convolution operation, for example, in both the temporal direction and the spatial directions (hereafter, a "three-dimensional convolution operation"), or a convolution operation only in the temporal direction (hereafter, a "time-dimensional convolution operation"). The temporal-feature convolution layers may also perform a convolution operation or a fully-connected operation in the channel direction. In the case that the second classifier includes multiple temporal-feature convolution layers, some of the temporal-feature convolution layers may perform a three-dimensional convolution operation whereas the other temporal-feature convolution layers may perform a time-dimensional convolution operation. The second classifier may also include one or more convolution layers that perform a convolution operation in the spatial directions without performing a convolution operation in the temporal direction (hereafter, "spatial-feature convolution layers"). The spatial-feature convolution layers may also perform a convolution operation or a fully-connected operation in the channel direction. In the case that the second classifier includes one or more spatial-feature convolution layers, the spatial-feature convolution layers and the temporal-feature convolution layers may be disposed in any order. For example, the spatial-feature convolution layers and the temporal-feature convolution layers may be provided in this order from the input toward the output, or in the opposite order. The spatial-feature convolution layers may alternate with the temporal-feature convolution layers. The second classifier may also include one or more pooling layers. The second classifier may also include one or more activation layers and one or more fully-connected layers. For example, the output layer of the second classifier uses a sigmoid function or a softmax function as an activation function. For each of right and left turn signals, the output layer of the second classifier outputs a confidence score indicating how likely the turn signal is in a blinking state, as the result of 1-class classification of the state of the turn signal. The output layer of the second classifier also outputs confidence scores respectively indicating how likely brake lights are in the turn-on state, the ON state, the turn-off state, and the OFF state, as the result of 4-class classification of the state of the brake lights. In the case that the output layer uses a sigmoid function as an activation function, the output values of the sigmoid function between 0 and 1 are calculated as the confidence scores of the respective states.

For example, combinations of a set of characteristics obtained from the object regions each including a vehicle represented in time series images obtained over the predetermined period and labels indicating the state of a turn signal (a blinking state or an OFF state) corresponding to this set of characteristics are used as training data related to states of a turn signal for training the second classifier. The second classifier that is trained using a large number of pieces of such training data in accordance with backpropagation can accurately calculate confidence scores of possible states of a turn signal.

Training data related to states of brake lights used for training the second classifier may also be similar to the above-described training data related to states of a turn signal. However, the state of brake lights changes depending on whether the driver applies brakes, and in particular, the length of the period during which brake lights are on is indefinite. For this reason, data including sets of sequential characteristics obtained from images captured in a period including the timing at which brake lights switch from OFF to ON or from ON to OFF is used as training data related to the turn-on state or the turn-off state of brake lights.

Figure 7:
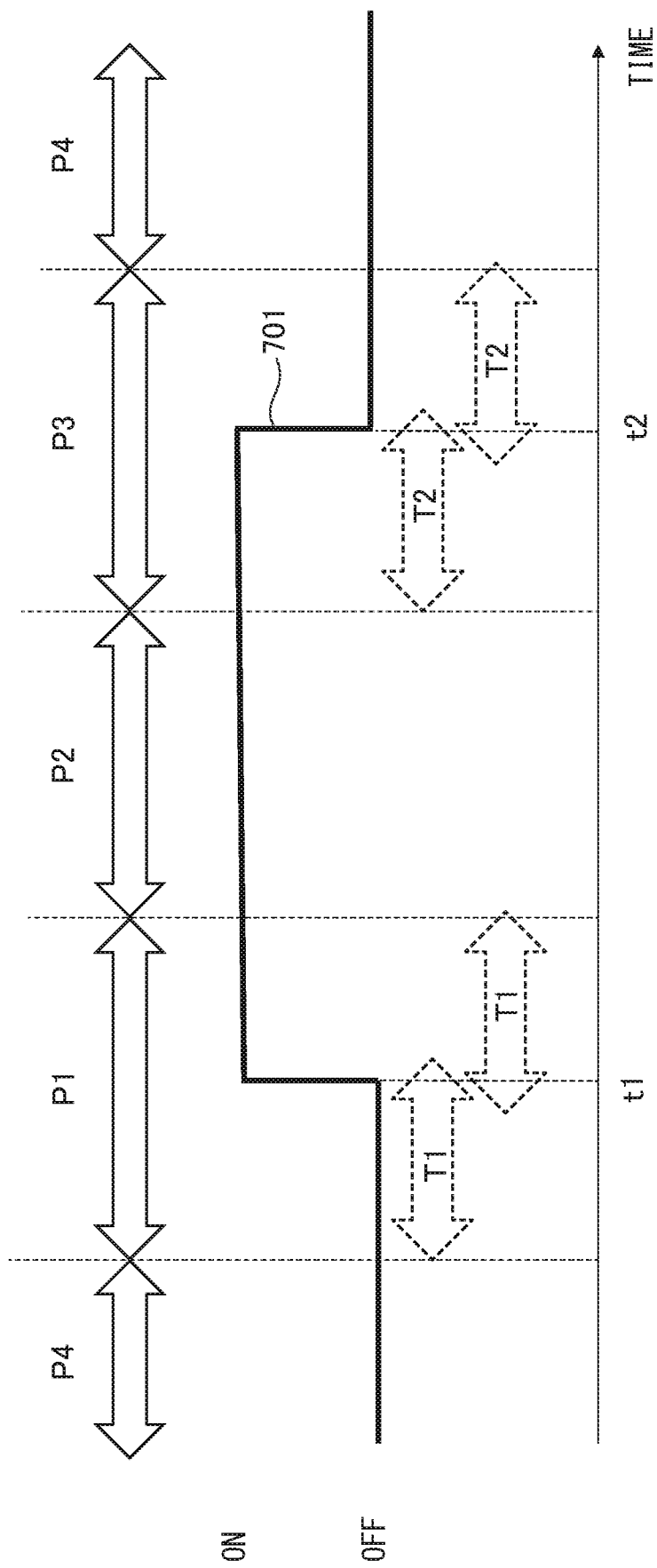
FIG. 7 illustrates an example of the relationship between individual states of brake lights and periods in which sets of sequential characteristics to be used as training data are obtained.

FIG. 7 illustrates an example of the relationship between individual states of brake lights and periods in which sets of sequential characteristics to be used as training data are obtained. The abscissa in FIG. 7 represents time. The waveform 701 indicates whether brake lights are ON or OFF. In this example, the brake lights switch from OFF to ON at time t1, and switch from ON to OFF at time t2. Hence, the brake lights change to the turn-on state in period P1 including time t1 and to the turn-off state in period P3 including time t2; each of these periods are twice as long as the period during which the second classifier performs a convolution operation in the temporal direction. The brake lights are kept on between times t1 and t2 and thus in the ON state in period P2 sandwiched between periods P1 and P3. The brake lights are kept off before time t1 and after time t2 and thus in the OFF state in period P4 that precedes period P1 or follows period P3. Hence, characteristics obtained from object regions in sequential images captured in period T1, which includes time t1 and is as long as the period during which the second classifier performs a convolution operation in the temporal direction, are used as training data labeled as the turn-on state. Similarly, characteristics obtained from object regions in sequential images captured in period T2, which includes time t2 and is as long as the period during which the second classifier performs a convolution operation in the temporal direction, are used as training data labeled as the turn-off state. Characteristics obtained from object regions in sequential images captured in a period that is included in period P2 and is as long as the period during which the second classifier performs a convolution operation in the temporal direction may be used as training data labeled as the ON state. Similarly, characteristics obtained from object regions in sequential images captured in a period that is included in period P4 and is as long as the period during which the second classifier performs a convolution operation in the temporal direction may be used as training data labeled as the OFF state.

Since the second classifier is merely required to process characteristics included in an object region, the second classifier includes smaller input and intermediate layers and is defined by fewer parameters, which include weighting factors, than the first classifier. For this reason, the amount of computation of the second classifier is less than that of the first classifier, allowing for reducing the computational burden on the processor 23. Further, the amount of computation required to train the second classifier is also reduced. In the case that the first and second classifiers are configured as neural networks, these neural networks may be trained together by backpropagation with common training data.

As the second classifier, the confidence-score calculating unit 33 may use, for example, a neural network having a recursive structure, such as a recurrent neural network (RNN), a long short-term memory (LSTM), or a gated recurrent unit (GRU). Since such a neural network having a recursive structure retains an operation result calculated from data inputted by the last time as an internal state and refers to the operation result retained as the internal state at every input of new data, time-varying changes in outward appearance of a signal light of a tracked vehicle are used for calculating confidence scores of states of the signal light. For this reason, the confidence-score calculating unit 33 can accurately calculate confidence scores of states of a signal light of a tracked vehicle, using a neural network having a recursive structure as the second classifier. The second classifier that is a neural network having a recursive structure may also be trained using training data like those described above.

In this case, the confidence-score calculating unit 33 may input, for each tracked target vehicle for signal-light identification, characteristics obtained from pixel values of the object region including the tracked vehicle into the second classifier every time an image is obtained from the camera 2. This enables the confidence-score calculating unit 33 to calculate confidence scores of respective possible states of a signal light of the tracked vehicle. For each tracked target vehicle for signal-light identification, the confidence-score calculating unit 33 outputs confidence scores of possible states of signal lights (right and left turn signals and brake lights) to the state identifying unit 34.

For each tracked target vehicle for signal-light identification, every time receiving confidence scores of possible states of signal lights from the confidence-score calculating unit 33, the state identifying unit 34 identifies the states of the signal lights, based on these confidence scores.

In the present embodiment, the confidence score of the blinking state is obtained for each of right and left turn signals. Thus, when the confidence score of the blinking state of the left turn signal of a tracked vehicle of interest is not less than a predetermined threshold, the state identifying unit 34 identifies the state of the left turn signal of this tracked vehicle as the blinking state. When the confidence score of the blinking state of the left turn signal of a tracked vehicle of interest is less than the predetermined threshold, the state identifying unit 34 identifies the state of the left turn signal of this tracked vehicle as the OFF state. The state identifying unit 34 may also identify the state of the right turn signal of the tracked vehicle of interest in a similar manner, based on whether the confidence score of the blinking state of the right turn signal is not less than the predetermined threshold.

Regarding brake lights, the length of the period during which brake lights are on varies depending on the circumstances, as described above. Hence, time-varying changes in characteristics obtained from time series images representing brake lights are not temporally periodic. Since outward appearance of brake lights is kept unchanged at a later time after their turning-on or turning-off, identifying the state of the brake lights may be difficult depending on the circumstances. For example, in the situation that the tail lights of a vehicle are on as in the nighttime or that the brake lights look as if they were on due to ambient light reflected near the brake lights, identifying whether the brake lights are on or off may be difficult at a later time after their turning-on or turning-off. For this reason, the accuracy of confidence scores of possible states of brake lights outputted from the second classifier may be insufficient in some cases.

In contrast, before and after the timing at which brake lights are turned on or off, sets of characteristics obtained from the object regions representing the brake lights in time series images can represent changes in their outward appearance. For this reason, before and after the timing at which brake lights are turned on or off, the accuracy of confidence scores of possible states of the brake lights outputted from the second classifier is sufficiently high.

Thus, the state identifying unit 34 identifies the state of brake lights, based on the preceding state of the brake lights, the allowed transition information, and confidence scores of possible candidate states of the brake lights. In the present embodiment, the state identifying unit 34 refers to the allowed transition information stored in the memory 22 to determine two or more possible states (i.e., candidate states) to which the preceding state of the brake lights is allowed to change. The state identifying unit 34 then identifies the latest state of the brake lights as one of the determined candidate states that has a maximum confidence score calculated by the second classifier.

Figure 8:
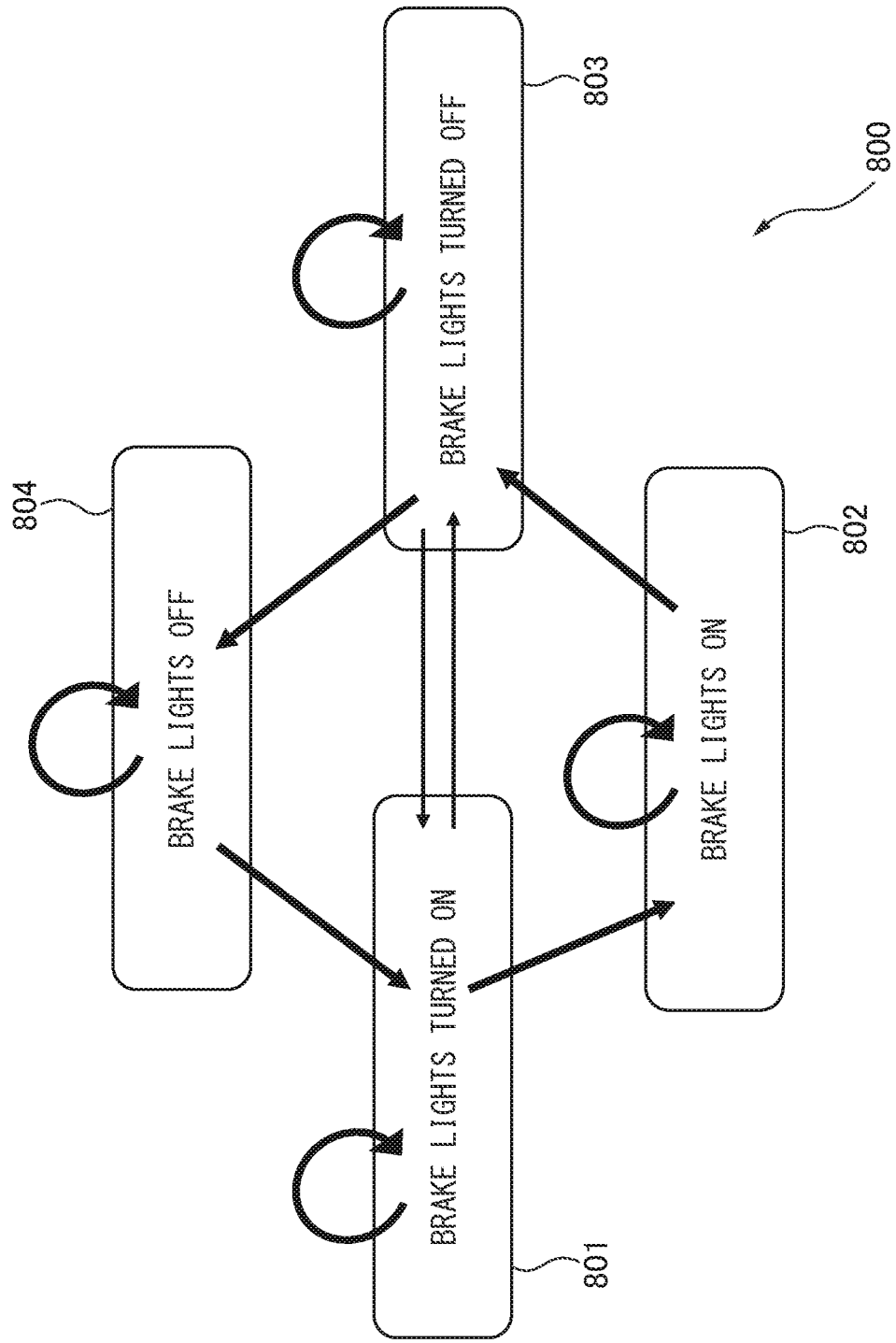
FIG. 8 illustrates an example of state transition of brake lights.

FIG. 8 illustrates an example of state transition of brake lights. In the state transition diagram 800 illustrated in FIG. 8, individual blocks represent possible states of brake lights, and individual arrows represent allowed state transition indicated in the allowed transition information. As illustrated in the state transition diagram 800, brake lights may be changed to four states, i.e., a turn-on state 801, an ON state 802, a turn-off state 803, and an OFF state 804. Brake lights in the turn-on state 801 cannot be kept off without switching from ON to OFF, and thus can only change to the ON state 802 or the turn-off state 803 or remain in the turn-on state 801 (i.e., no change in state). Brake lights in the ON state 802 cannot be kept off or turned on again without switching from ON to OFF, and thus can only change to the turn-off state 803 or remain in the ON state 802 (i.e., no change in state). Brake lights in the turn-off state 803 cannot be kept on without switching from OFF to ON, and thus can only change to the OFF state 804 or the turn-on state 801 or remain in the turn-off state 803 (i.e., no change in state). Brake lights in the OFF state 804 cannot be kept on or turned off again without switching from OFF to ON, and thus can only change to the turn-on state 801 or remain in the OFF state 804 (i.e., no change in state).

For example, when the preceding state of the brake lights of a tracked vehicle of interest is the turn-on state, the state identifying unit 34 identifies the state of the brake lights as the turn-on state, the ON state, or the turn-off state corresponding to the highest confidence score. Thus, even if the confidence score of the OFF state is the highest of the confidence scores of the respective candidate states of the brake lights obtained this time, the state of the brake lights will not be identified as the OFF state.

For example, when the preceding state of the brake lights of a tracked vehicle of interest is the OFF state, the state identifying unit 34 identifies the state of the brake lights as the OFF state or the turn-on state corresponding to the highest confidence score. Thus, even if the confidence score of the ON state or the turn-off state is the highest of the confidence scores of the respective candidate states of the brake lights obtained this time, the state of the brake lights will not be identified as the ON state or the turn-off state. As in these examples, erroneous identification of the state of brake lights is prevented.

According to a modified example, whether a transition from a candidate state of brake lights to another candidate state is allowed may be expressed as a probability of transition between these candidate states. In this case, probabilities of transition between the candidate states are pre-stored in the memory 22 as the allowed transition information. In this case, the state identifying unit 34 calculates, for each possible candidate state of brake lights, a corrected confidence score by multiplying the confidence score of the candidate state by the probability of transition from the preceding state of the brake lights to the candidate state. Then, the state identifying unit 34 may identify the latest state of the brake lights as one of the possible candidate states of the brake lights that has a maximum corrected confidence score.

In this case, the state identifying unit 34 may dynamically vary the probabilities of transition between the candidate states, depending on the circumstances around the vehicle 10 or a tracked vehicle of interest. For example, in the case that the vehicle 10 includes a range sensor, the state identifying unit 34 may determine whether a tracked vehicle of interest is slowing down, based on changes in the distance to this tracked vehicle measured by the range sensor. Alternatively, in the case that the range sensor can measure the speed of a tracked vehicle of interest by itself, e.g., in the case that the range sensor is radar, the state identifying unit 34 may use the result of measurement of the speed obtained by the range sensor to determine whether this tracked vehicle is slowing down. The position of the object region including a tracked vehicle of interest in an image corresponds one-to-one to the direction from the camera 2 to this tracked vehicle, and the positional relationship between the camera 2 and the range sensor is known. Hence, the state identifying unit 34 can estimate the direction from the range sensor to a tracked vehicle of interest, based on the position of the object region including this tracked vehicle in an image. Thus, the state identifying unit 34 may use the result of measurement obtained by the range sensor in the estimated direction as the distance to the tracked vehicle of interest or the speed thereof. When the tracked vehicle of interest is not slowing down, the state identifying unit 34 may decrease the probabilities of transition to the turn-on state and to the ON state or increase the probabilities of transition to the turn-off state and to the OFF state because this tracked vehicle is unlikely to apply brakes.

The state identifying unit 34 may determine whether a tracked vehicle of interest follows another vehicle, based on the result of object detection performed by the object detecting unit 31. When a tracked vehicle of interest follows another vehicle, the state identifying unit 34 may increase the probabilities of transition to the turn-on state and to the ON state or decrease the probabilities of transition to the turn-off state and to the OFF state because this tracked vehicle may apply brakes.

Additionally, the ECU 3 may dynamically vary the probabilities of transition between the candidate states, based on traffic information received via a wireless communication terminal. For example, as the vehicle 10 approaches a location of traffic restrictions or a traffic jam indicated by traffic information, the probability that other vehicles near the vehicle 10 apply brakes increases. Hence, as the current location of the vehicle 10 measured by, for example, a GPS receiver approaches a location of traffic restrictions or a traffic jam, the state identifying unit 34 may increase the probabilities of transition to the turn-on state and to the ON state or decrease the probabilities of transition to the turn-off state and to the OFF state for all of the tracked vehicles.

According to another modified example, the state identifying unit 34 may perform maximum likelihood estimation to determine the state of the brake lights of a tracked vehicle of interest, based on confidence scores of possible candidate states of the brake lights calculated every time an image is obtained in a preceding certain period and the probabilities of transition between the possible candidate states of the brake lights. In this case, the state identifying unit 34 may determine the state of the brake lights in accordance with one of various maximum likelihood methods that are applicable to the case that the state of a target changes with the passage of time.

The state identifying unit 34 inputs the results of signal-light identification regarding the respective tracked target vehicles in detected-object list, and notifies these results to the driving planning unit 35.

The driving planning unit 35 refers to the detected-object list to generate one or more trajectories to be traveled of the vehicle 10 so that the vehicle 10 will not collide with an object near the vehicle 10. Each trajectory to be traveled is represented as, for example, a set of target locations of the vehicle 10 at points in time from the current time to a predetermined time ahead thereof. For example, the driving planning unit 35 refers to the detected-object list to perform viewpoint transformation, using information such as the position at which the camera 2 is mounted on the vehicle 10, thereby transforming the image coordinates of the objects in the detected-object list into coordinates in an aerial image ("aerial-image coordinates"). The driving planning unit 35 then performs a tracking process on sequential aerial-image coordinates, using a Kalman filter, a particle filter, or another filter, to track the objects entered in the detected-object list, and uses the trajectories obtained from the tracking results to determine predicted trajectories of the respective objects to a predetermined time ahead. The driving planning unit 35 uses the results of signal-light identification regarding vehicles to determine the predicted trajectories. For example, when the left turn signal of a vehicle of interest is in the blinking state, it is highly likely that this vehicle will make a lane change to the left or a left turn. For this vehicle, the driving planning unit 35 determines a predicted trajectory such that it will make a lane change to the left or a left turn. When the brake lights of a vehicle of interest are the turn-on state, it is highly likely that this vehicle will slow down. For this vehicle, the driving planning unit 35 determines a predicted trajectory such that it will slow down as compare to the present time. When the right and left turn signals of a vehicle of interest are in the OFF state and the brake lights thereof are in the turn-off state or the OFF state, it is highly likely that this vehicle will travel straight without slowing down. For this vehicle, the driving planning unit 35 determines a predicted trajectory such that it will travel straight without slowing down.

The driving planning unit 35 generates a trajectory to be traveled of the vehicle 10, based on the predicted trajectories of the tracked objects and the location, speed, and orientation of the vehicle 10, so that a predicted distance between the vehicle 10 and any of the tracked objects will be not less than a predetermined distance until a predetermined time ahead. The driving planning unit 35 can estimate the location, speed, and orientation of the vehicle 10, based on, for example, current location information that is obtained from a GPS receiver (not illustrated) mounted on the vehicle 10 and indicates the current location of the vehicle 10. Alternatively, every time an image is obtained by the camera 2, a localizing processing unit (not illustrated) may detect lane division lines on the right and left of the vehicle 10 from this image, and compare the detected lane division lines with the map information stored in the memory 22, thereby estimating the location, speed and orientation of the vehicle 10. Additionally, the driving planning unit 35 may refer to, for example, the current location information of the vehicle 10 and the map information stored in the memory 22 to count the number of lanes available for travel by the vehicle 10. When more than one lane is available for travel by the vehicle 10, the driving planning unit 35 may generate a trajectory to be traveled so that the vehicle 10 will make a lane change.

The driving planning unit 35 may generate multiple trajectories to be traveled. In this case, the driving planning unit 35 may select one of the trajectories to be traveled such that the sum of the absolute values of acceleration of the vehicle 10 is the smallest.

The driving planning unit 35 notifies the vehicle control unit 36 of the generated trajectory to be traveled.

The vehicle control unit 36 controls the components of the vehicle 10 so that the vehicle 10 will travel along the notified trajectory. For example, the vehicle control unit 36 determines the acceleration of the vehicle 10 in accordance with the notified trajectory and the current speed of the vehicle 10 measured by a vehicle speed sensor (not illustrated), and determines the degree of accelerator opening or the amount of braking so that the acceleration of the vehicle 10 will be equal to the determined acceleration. The vehicle control unit 36 then determines the amount of fuel injection in accordance with the determined degree of accelerator opening, and outputs a control signal depending on the amount of fuel injection to a fuel injector of the engine of the vehicle 10. Alternatively, the vehicle control unit 36 outputs a control signal depending on the determined amount of braking to the brake of the vehicle 10.

When the vehicle 10 changes its course in order to travel along the trajectory, the vehicle control unit 36 determines the steering angle of the vehicle 10 in accordance with the trajectory, and outputs a control signal depending on the steering angle to an actuator (not illustrated) controlling the steering wheel of the vehicle 10.

Figure 9:
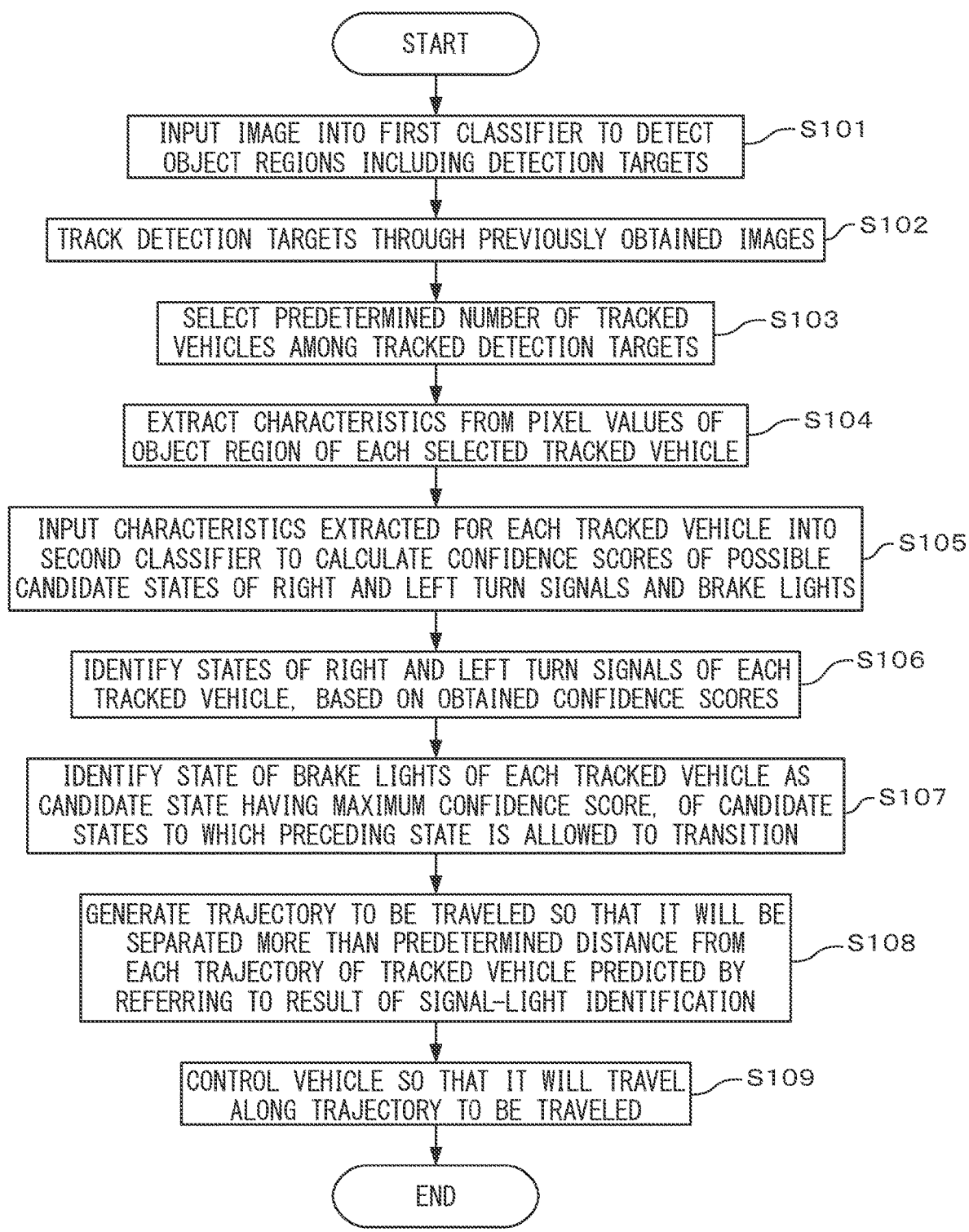
FIG. 9 is an operation flowchart of the vehicle control process including the signal-light identifying process.

FIG. 9 is an operation flowchart of the vehicle control process that includes the signal-light identifying process and is performed by the processor 23. Every time receiving an image from the camera 2, the processor 23 performs the vehicle control process in accordance with the operation flowchart illustrated in FIG. 9. In the following operation flowchart, the process of steps S101 to S107 corresponds to the signal-light identifying process.

The object detecting unit 31 of the processor 23 inputs the latest image obtained from the camera 2 into the first classifier to detect detection targets (including vehicles) represented in the image. More specifically, the object detecting unit 31 detects object regions including detection targets in the image (step S101). In addition, the object detecting unit 31 identifies the type of each detected detection target. The object detecting unit 31 then enters the detected detection targets in the detected-object list.

For each of the object regions including the respective detection targets in the latest image, the tracking unit 32 of the processor 23 tracks the detection target represented in the object region in the latest image, based on this object region and the object regions in the past images (step S102). The tracking unit 32 selects, out of the tracked detection targets, a predetermined number of vehicles as tracked target vehicles for signal-light identification (step S103).

For each tracked target vehicle for signal-light identification, the confidence-score calculating unit 33 of the processor 23 extracts characteristics from pixel values of the object region representing the tracked vehicle (step S104). For each tracked target vehicle for signal-light identification, the confidence-score calculating unit 33 inputs the extracted characteristics into the second classifier to calculate confidence scores of possible candidate states of the right and left turn signals and the brake lights of the tracked vehicle (step S105).

For each tracked target vehicle for signal-light identification, the state identifying unit 34 of the processor 23 identifies the states of the right and left turn signals, based on the confidence scores obtained for possible candidate states of the turn signals (step S106).

For each tracked target vehicle for signal-light identification, the state identifying unit 34 also identifies the latest state of the brake lights as a candidate state having a maximum confidence score, of the candidate states to which the preceding state is allowed to change (step S107).

The driving planning unit 35 of the processor 23 determines predicted trajectories of the tracked vehicles by referring to the results of signal-light identification regarding the tracked vehicles, and generates a trajectory to be traveled of the vehicle 10 so that the trajectory to be traveled will be separated more than a predetermined distance from any of the predicted trajectories of the tracked vehicles (step S108). The driving planning unit 35 refers to the detected-object list to generate the trajectory to be traveled of the vehicle 10 so that the trajectory to be traveled will be separated more than a predetermined distance from any of the predicted trajectories of the detection targets entered in the detected-object list other than the tracked vehicles. The vehicle control unit 36 of the processor 23 then controls the vehicle 10 so that the vehicle 10 will travel along the trajectory (step S109). The processor 23 then terminates the vehicle control process.

As has been described above, the apparatus for identifying the state of a signal light inputs time series images into the first classifier to detect object regions each including a vehicle from the respective images, and tracks this vehicle. The apparatus also inputs, for each tracked vehicle, characteristics obtained from pixel values of the object regions into the second classifier, which has a recursive structure or performs a convolution operation in the temporal direction, thereby calculating confidence scores of possible candidate states of a signal light of the vehicle. The apparatus then identifies the state of the signal light of the vehicle, based on information as to whether transitions from the preceding state of the signal light of the vehicle to individual candidate states are allowed, and the confidence scores of the respective candidate states. In this way, the apparatus can accurately identify states related to ON and OFF of a signal light even if the cycle of ON and OFF of the signal light and the length of the period during which the signal light is on are indefinite.

Additionally, since it uses the first classifier, which detects an object from an individual image, to extract characteristics to be inputted into the second classifier from each of the time series images, the apparatus can reduce the total amount of computation as compared to the case in which the whole image is inputted into a classifier having a recursive structure or performing a convolution operation in the temporal direction to identify the state of a signal light. Additionally, images used to train the first classifier may be still images; in contrast, moving images are necessary to train the second classifier, but the size of each image included in the moving images may be smaller than that of the individual images used to train the first classifier. For this reason, the apparatus requires less cost of training the classifiers (e.g., cost incurred to collect and annotate training images), and requires a smaller amount of computation and a shorter computation time to train the classifiers.

According to a modified example, the second classifier used by the confidence-score calculating unit 33 may be trained in advance to indicate the result of classification into three classes regarding the state of brake lights, i.e., the turn-on state, the turn-off state, and a steady state implying that the brake lights are on or off. In this case, the output layer of the second classifier uses a sigmoid function or a softmax function as an activation function to output confidence scores of these three states. For example, the output layer of the second classifier that uses a sigmoid function as an activation function outputs confidence scores having values between 0 and 1 for the turn-on state, the turn-off state, and the steady state, respectively.

In this case also, the state identifying unit 34 may identify the state of brake lights, based on the preceding state of the brake lights, whether transitions between the states are allowed, and the confidence scores calculated by the second classifier, as in the above-described embodiment.

Figure 10:
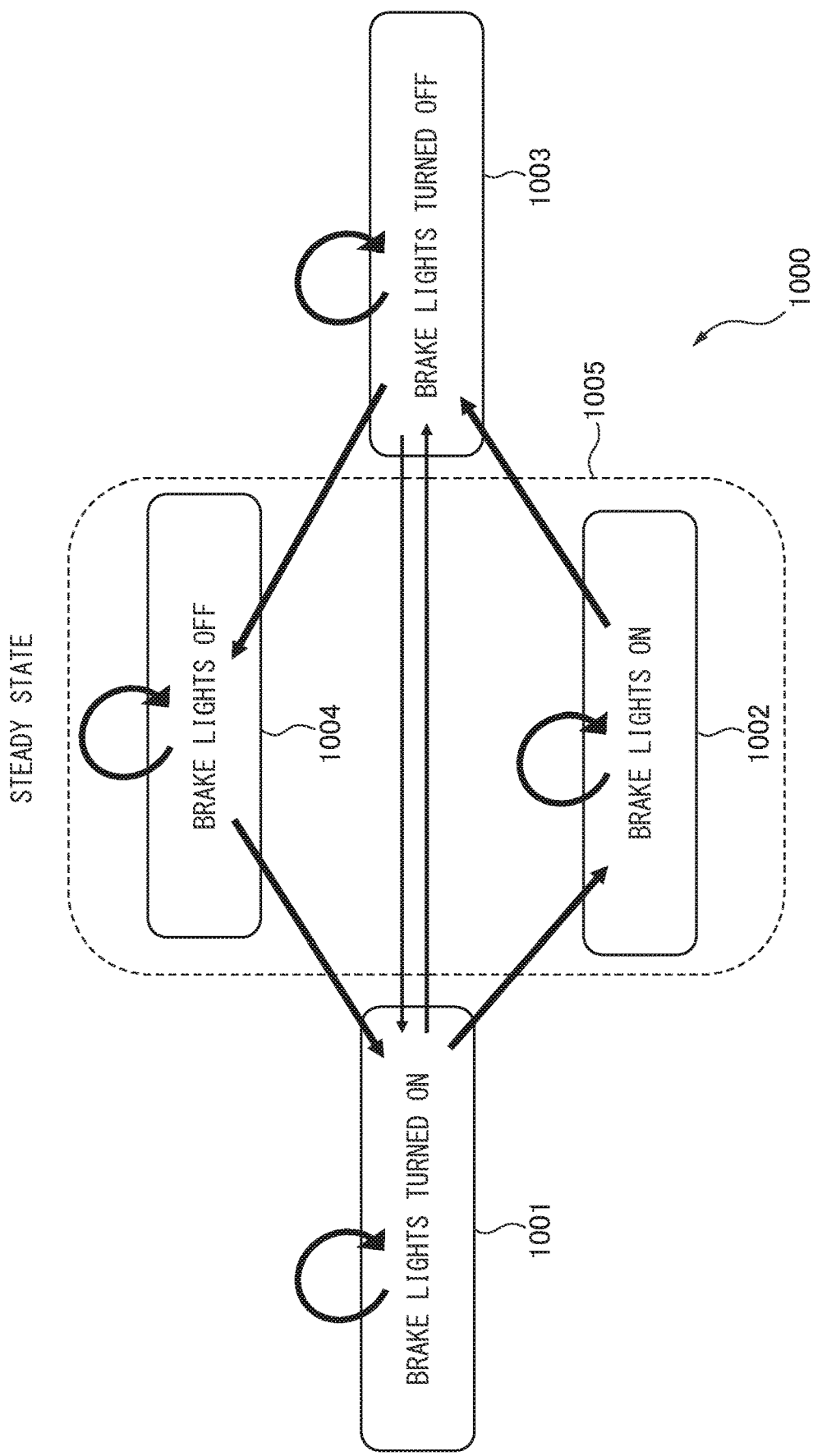
FIG. 10 illustrates an example of state transition of brake lights according to a modified example.

FIG. 10 illustrates an example of state transition of brake lights according to this modified example. In the state transition diagram 1000 illustrated in FIG. 10, individual blocks represent possible candidate states of brake lights, and individual arrows represent allowed state transition indicated in the allowed transition information. As illustrated in the state transition diagram 1000, brake lights may be changed to four candidate states, i.e., a turn-on state 1001, an ON state 1002, a turn-off state 1003, and an OFF state 1004. The ON state 1002 and the OFF state 1004 are included in a steady state 1005 that is one of the three classes classified by the second classifier regarding the state of brake lights.

As in the embodiment, brake lights in the turn-on state 1001 can only change to the ON state 1002 or the turn-off state 1003 or remain in the turn-on state 1001 (i.e., no change in state). Thus, when the preceding state of the brake lights of a tracked vehicle of interest is the turn-on state 1001, the state identifying unit 34 identifies the latest state of the brake lights as the turn-on state 1001, the turn-off state 1003, or the steady state 1005 that has the highest confidence score obtained by the second classifier. However, when the confidence score of the steady state 1005 is the highest, the state identifying unit 34 identifies the latest state of the brake lights as the ON state 1002, which is one of the two states (the ON state 1002 and the OFF state 1004) included in the steady state 1005.

Brake lights in the ON state 1002 can only change to the turn-off state 1003 or remain in the ON state 1002 (i.e., no change in state). Thus, when the preceding state of the brake lights of a tracked vehicle of interest is the ON state 1002, the state identifying unit 34 identifies the latest state of the brake lights as the turn-off state 1003 or the steady state 1005 that has a higher confidence score obtained by the second classifier. However, when the confidence score of the steady state 1005 is higher than that of the turn-off state 1003, the state identifying unit 34 identifies the latest state of the brake lights as the ON state 1002, which is one of the two states (the ON state 1002 and the OFF state 1004) included in the steady state 1005.

Brake lights in the turn-off state 1003 can only change to the OFF state 1004 or the turn-on state 1001 or remain in the turn-off state 1003 (i.e., no change in state). Thus, when the preceding state of the brake lights of a tracked vehicle of interest is the turn-off state 1003, the state identifying unit 34 identifies the latest state of the brake lights as the turn-on state 1001, the turn-off state 1003, or the steady state 1005 that has the highest confidence score obtained by the second classifier. However, when the confidence score of the steady state 1005 is the highest, the state identifying unit 34 identifies the latest state of the brake lights as the OFF state 1004, which is one of the two states (the ON state 1002 and the OFF state 1004) included in the steady state 1005.

Brake lights in the OFF state 1004 can only change to the turn-on state 1001 or remain in the OFF state 1004 (i.e., no change in state). Thus, when the preceding state of the brake lights of a tracked vehicle of interest is the OFF state 1004, the state identifying unit 34 identifies the latest state of the brake lights as the turn-on state 1001 or the steady state 1005 that has a higher confidence score obtained by the second classifier. However, when the confidence score of the steady state 1005 is higher than that of the turn-on state 1001, the state identifying unit 34 identifies the latest state of the brake lights as the OFF state 1004, which is one of the two states (the ON state 1002 and the OFF state 1004) included in the steady state 1005.

According to this modified example, the second classifier can be trained with two candidate states (the ON state and the OFF state) that may be difficult for the second classifier to classify regarded as one state, and thus can calculate confidence scores of respective candidate states of brake lights more correctly.

In this modified example, the allowed transition information may be defined as probabilities of transition from the possible candidate states of brake lights to other candidate states. The state identifying unit 34 corrects, for each possible candidate state of brake lights, the confidence score by multiplying the confidence score of the candidate state by the probability of transition from the preceding state of the brake lights to the candidate state. Then, the state identifying unit 34 may identify the latest state of the brake lights as one of the possible candidate states of the brake lights that has the highest corrected confidence score. In this case, the state identifying unit 34 may dynamically vary the probabilities of transition between the candidate states, depending on the circumstances around the vehicle 10 or a tracked vehicle of interest. Additionally, the state identifying unit 34 may perform maximum likelihood estimation to determine the state of the brake lights of a tracked vehicle of interest, based on confidence scores of possible candidate states of the brake lights calculated every time an image is obtained in a preceding certain period and the probabilities of transition between the possible candidate states of the brake lights, as in the above-described embodiment.

In general, a vehicle is unlikely to apply brakes immediately after releasing brakes. In other words, brake lights are unlikely to be turned on immediately after turned off. Thus, when the preceding state of the brake lights of a tracked vehicle of interest is the turn-off state in the above-described embodiment or modified examples, the state identifying unit 34 may identify the state of the brake lights as the OFF state or the turn-off state that has a higher confidence score obtained by the second classifier. In the case that the allowed transition information is defined as probabilities of transition between candidate states, the probability of transition from the turn-off state to the turn-on state may be set lower than the probability of transition from the turn-off state to the OFF state and the probability that the turn-off state is maintained.

In the above-described embodiment or modified examples, the allowed transition information may be referred to when the second classifier is trained. A cost function for the training may be adjusted depending on whether a transition from one of the possible candidate states of brake lights having a maximum confidence score at acquisition of the preceding image (hereafter, the "preceding candidate state") to one of the possible candidate states of the brake lights having a maximum confidence score at acquisition of the latest image (hereafter, the "next candidate state") is allowed in the allowed transition information. For example, the cost function may be adjusted so that the values thereof for the case that a transition from the preceding candidate state to the next candidate state is forbidden will be greater than those for the case that a transition from the preceding candidate state to the next candidate state is allowed. In this way, the second classifier is configured to calculate confidence scores of possible states of brake lights more correctly.

According to another modified example, the confidence-score calculating unit 33 may further calculate confidence scores of states of a hazard light or a flasher (a signal light that is mounted on, for example, a patrol car, a fire engine, or an ambulance and is used for notification of a state of emergency) of a tracked vehicle of interest. In this case, the second classifier is trained in advance to further output confidence scores of possible states of a hazard light (a blinking state or an OFF state) or confidence scores of possible states of a flasher (a flashing state or an OFF state).

A hazard light in the blinking state blinks in a certain cycle, similarly to a turn signal. Similarly, a flasher in a flashing state rotates a built-in light-emitting device in a certain cycle. Thus, the state identifying unit 34 can identify the states of a hazard light and a flasher, similarly to identification of the state of a turn signal. More specifically, when the confidence score of the blinking state of the hazard light of a tracked vehicle of interest is not less than a predetermined threshold, the state identifying unit 34 identifies the state of the hazard light as the blinking state.

When the confidence score of the blinking state of the hazard light is less than the predetermined threshold, the state identifying unit 34 identifies the state of the hazard light as the OFF state. Similarly, when the confidence score of the flashing state of the flasher of a tracked vehicle of interest is not less than a predetermined threshold, the state identifying unit 34 identifies the state of the flasher as the flashing state. When the confidence score of the flashing state of the flasher is less than the predetermined threshold, the state identifying unit 34 identifies the state of the flasher as the OFF state.

According to still another modified example, the object detecting unit 31 may use a classifier other than a DNN, to detect a detection target from an image. For example, the object detecting unit 31 may use, as the first classifier, a support vector machine (SVM) that has been trained to output a confidence score indicating how likely a detection target is to be represented in a window defined on an image, in response to input of features (e.g., HOG) calculated with respect to the window. The object detecting unit 31 calculates the features with respect to a window defined on an image while variously changing the position, size, and aspect ratio of the window, and inputs the calculated features into the SVM to obtain the confidence score for the window. Then, the object detecting unit 31 may determine that a window for which the confidence score of a certain type of detection target is not less than a predetermined confidence-score threshold represents this detection target, and regard this window as an object region. The SVM may be prepared for each type of target object for detection. In this case, the object detecting unit 31 may input, for each window, the features calculated from the window into the SVMs to calculate the confidence scores of the respective types of objects. In this case, the characteristics of an object region inputted into the second classifier of the state identifying unit 34 may be features, such as HOG, which are extracted from the window (i.e., the object region) representing the detection target and are inputted into the SVM.

A computer program for achieving the functions of the units of the processor 23 of the apparatus according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. An apparatus for identifying the state of a signal light, comprising:
 a processor configured to: input time series images into a first classifier to detect object regions each including a vehicle equipped with a signal light in the respective images, the first classifier having been trained to detect the vehicle;
  chronologically input characteristics obtained from pixel values of the object regions detected in the respective images into a second classifier to calculate confidence scores of possible candidate states of the signal light of the vehicle, the second classifier having a recursive structure or performing a convolution operation in a temporal direction; and
  identify the state of the signal light, based on the preceding state of the signal light, information indicating whether transitions between the candidate states are allowed, and the confidence scores of the respective candidate states;
 wherein the information indicates candidate states to which the respective candidate states are allowed to change, and of the candidate states to which the preceding state of the signal light is allowed to change, the processor identifies the state of the signal light as a candidate state having a maximum confidence score; and
 wherein the candidate states include a turn-on state in which the signal light is turned on, a turn-off state in which the signal light is turned off, an ON state during which the signal light is on, and an OFF state during which the signal light is off.

2. The apparatus according to claim 1, wherein the second classifier calculates confidence scores of the turn-on state, the turn-off state, and a steady state that implies the ON state or the OFF state.

3. The apparatus according to claim 2, wherein the information indicates that the turn-on state is allowed to change to the turn-on state itself, the ON state, or the turn-off state, and
 when the preceding state of the signal light is the turn-on state and the steady state has a higher confidence score than the turn-on state and the turn-off state, the processor identifies the state of the signal light as the ON state.

4. The apparatus according to claim 2, wherein the information indicates that the turn-off state is allowed to change to the turn-off state itself, the OFF state, or the turn-on state, and
 when the preceding state of the signal light is the turn-off state and the steady state has a higher confidence score than the turn-on state and the turn-off state, the processor identifies the state of the signal light as the OFF state.

5. The apparatus according to claim 1, wherein the information indicates, for each of the candidate states, probabilities of transition from the candidate state to other candidate states, and
 the processor calculates, for each of the candidate states, a corrected confidence score by multiplying the confidence score of the candidate state by the probability of transition from the preceding state of the signal light to the candidate state, and identifies the state of the signal light as one of the candidate states having a maximum corrected confidence score.

6. A controller for controlling travel of a vehicle, the controller comprising:
 a processor configured to: input time series images into a first classifier to detect object regions each including another vehicle equipped with a signal light in the respective images, the first classifier having been trained to detect the other vehicle;
  chronologically input characteristics obtained from pixel values of the object regions detected in the respective images into a second classifier to calculate confidence scores of possible candidate states of the signal light of the other vehicle, the second classifier having a recursive structure or performing a convolution operation in a temporal direction;
  identify the state of the signal light, based on the preceding state of the signal light, information indicating whether transitions between the candidate states are allowed, and the confidence scores of the respective candidate states;
  predict a trajectory on which the other vehicle will travel, based on the state of the signal light;

determine a trajectory to be traveled of the vehicle, based on the predicted trajectory, so that the vehicle will be separated from the other vehicle more than a predetermined distance; and control the vehicle so that the vehicle will travel along the trajectory to be traveled.

7. A method for identifying the state of a signal light, comprising:

inputting time series images into a first classifier to detect object regions each including a vehicle equipped with a signal light in the respective images, the first classifier having been trained to detect the vehicle;

chronologically inputting characteristics obtained from pixel values of the object regions detected in the respective images into a second classifier to calculate confidence scores of possible candidate states of the signal light of the vehicle, the second classifier having a recursive structure or performing a convolution operation in a temporal direction; and identifying the state of the signal light, based on the preceding state of the signal light, information indicating whether transitions between the candidate states are allowed, and the confidence scores of the respective candidate states;

wherein the information indicates candidate states to which the respective candidate states are allowed to change, and of the candidate states to which the preceding state of the signal light is allowed to change, the processor identifies the state of the signal light as a candidate state having a maximum confidence score; and wherein the candidate states include a turn-on state in which the signal light is turned on, a turn-off state in which the signal light is turned off, an ON state during which the signal light is on, and an OFF state during which the signal light is off.

8. A non-transitory recording medium having recorded thereon a computer program for identifying the state of a signal light, the computer program causing a computer to execute a process comprising:

inputting time series images into a first classifier to detect object regions each including a vehicle equipped with a signal light in the respective images, the first classifier having been trained to detect the vehicle;

chronologically inputting characteristics obtained from pixel values of the object regions detected in the respective images into a second classifier to calculate confidence scores of possible candidate states of the signal light of the vehicle, the second classifier having a recursive structure or performing a convolution operation in a temporal direction; and identifying the state of the signal light, based on the preceding state of the signal light, information indicating whether transitions between the candidate states are allowed, and the confidence scores of the respective candidate states;

wherein the information indicates candidate states to which the respective candidate states are allowed to change, and of the candidate states to which the preceding state of the signal light is allowed to change, the processor identifies the state of the signal light as a candidate state having a maximum confidence score; and wherein the candidate states include a turn-on state in which the signal light is turned on, a turn-off state in which the signal light is turned off, an ON state during which the signal light is on, and an OFF state during which the signal light is off.

* * * * *